United States Patent [19]
Rees

[15] 3,737,502
[45] June 5, 1973

[54] METHOD OF MOLDING WITH FLASH REMOVAL BY MOLD ROTATION

[75] Inventor: Clive Rees, Newport, England

[73] Assignee: Girling Limited, Birmingham, England

[22] Filed: Oct. 12, 1970

[21] Appl. No.: 79,756

[30] Foreign Application Priority Data
Oct. 24, 1969 Great Britain..........52,099/69

[52] U.S. Cl. ..................264/161, 264/312, 264/318, 264/328, 264/334
[51] Int. Cl.............................B28b 7/20, B29c 17/00
[58] Field of Search......264/161, 318, 320, 328, 334; 18/DIG. 51

[56] References Cited
UNITED STATES PATENTS

| | | | |
|---|---|---|---|
| 2,558,026 | 6/1951 | Wilson | 264/161 |
| 3,071,814 | 1/1963 | Guggenheim | 264/320 |
| 3,373,460 | 3/1968 | Ladney | 18/DIG. 58 X |
| 3,443,001 | 5/1969 | Adair et al. | 18/DIG. 51 X |

Primary Examiner—Robert F. White
Assistant Examiner—Willard E. Hoag
Attorney—Scrivener, Parker, Scrivener and Clarke

[57] ABSTRACT

An article, for example a piston, having in its outer surface a continuous recess in the form of an undercut, impression or groove is moulded from a synthetic resinous material in a cavity between axially separable parts of a die assembly. Interposed between adjacent faces of the separable parts of the die assembly and in abutment therewith are at least two separable, complementary, interengaging die plates arranged in edge-to-edge relationship with each other. An opening is defined between the abutting edges of the die plates and is of constant depth and diameter. The opening defines an intermediate portion of the cavity between open-ended chambers in the separable die parts, and the intermediate portion is of reduced diameter and defines the recess in the article. During the moulding process the die plates are rotated relatively to the article to remove any flash occuring at the interface between the die plates and the surface of the article at points where the die plates abut each other.

6 Claims, 3 Drawing Figures

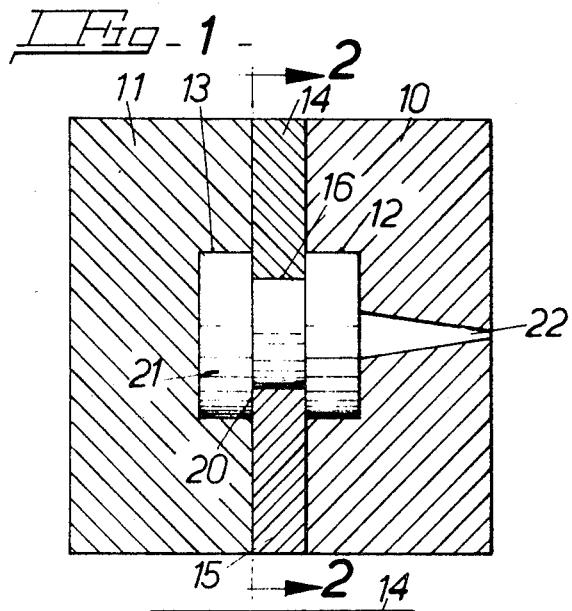
Fig-1-
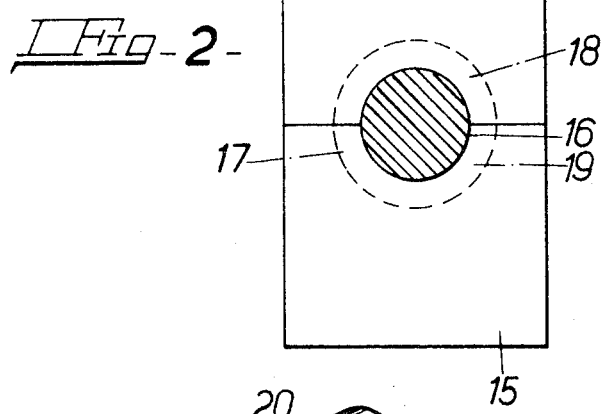
Fig-2-
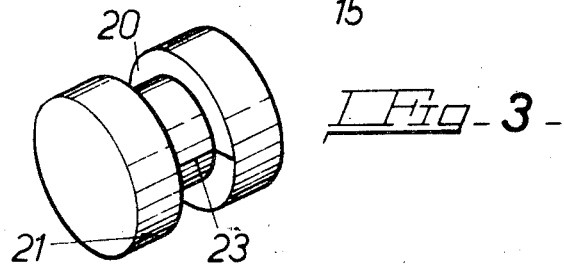
Fig-3-

METHOD OF MOLDING WITH FLASH REMOVAL BY MOLD ROTATION

SPECIFIC DESCRIPTION

This invention relates to improvements in the manufacture of articles by moulding synthetic resinous materials. More particularly the invention is concerned with a new or improved method and means for moulding from synthetic resinous materials articles provided in their outer faces with a continuous undercut, impression or groove.

It is known to manufacture by moulding from synthetic resinous materials, articles provided in their outer faces with undercuts, impressions or grooves. Hitherto such articles have been moulded in a split-die in which the split line in the finished article is transversely of the undercut, impression or groove.

According to our invention an article having in its outer surface a continuous undercut, impression or groove defining a cylindrical portion of constant width and diameter is moulded in a cavity between axially separable parts of a die assembly from a synthetic resinous material and there is interposed between adjacent faces of the separable parts of the die assembly and in abutment therewith at least two separable complementary interengaging die plates having abutting edge faces disposed at least in part within the area of the cavity and having portions at adjacent edges projecting into the cavity which portions are of dimensions equal to those of the undercut, impression or groove in the article to provide the undercut, impression or groove in the article during the moulding process, and the article and the die plate are rotated relatively to each other during the moulding process about the axis of the cylindrical portion to remove from the cylindrical portion any flash occurring at the radially innermost ends of the abutting edge faces of the die plate portions which define the cylindrical portion.

The relative rotation between the die plates and the article takes place at the termination of the moulding process before releasing the moulding pressure and allowing the article to cool.

Removal of the flash at the termination of the moulding process provides the cylindrical base of the undercut, impression or groove with a surface finish which provides a satisfactory seating for a resilient sealing ring, without the necessity of an additional machining or flash-removal operation.

When the article is itself of circular cross section and cylindrical outline, providing the undercut, impression or groove in the article during the moulding process ensures that a greater degree of concentricity between the cylindrical base of the undercut, impression or groove, and the outer surface of the article can be achieved than has hitherto been possible using conventional machining methods, and the elimination of the machining operation reduces substantially the cost of the article.

One embodiment of our invention is illustrated in the accompanying drawings in which:

FIG. 1 is a longitudinal section through a die for moulding a cylindrical piston or plunger, for example for incorporation in a master cylinder of an hydraulic system of a vehicle;

FIG. 2 is a perspective view of the finished piston or plunger.

A piston or plunger for use in a master cylinder of an hydraulic system of a vehicle, for example an hydraulic braking or clutch system, is adapted to be moulded in the die illustrated in FIGS. 1 and 2 of the drawings. The die comprises two parts 10 and 11 formed in adjacent end faces with axially aligned cylindrical chambers 12 and 13 of equal diameters.

A pair of die plates 14 and 15 of equal widths are interposed between the adjacent end faces of the die parts 10 and 11, and mating faces at the innermost ends of the plates 14 and 15 abut on a diameter common to each chamber 12 and 13.

A semi-circular recess is formed in the innermost end of each plate 14, 15 in a position lying within the area defined by the chamber 12 and 13 and, when the plates 14 and 15 are in abutment, the recesses define a common circular opening 16 having its center on the common axis of the chambers 12 and 13. The opening is defined by the inner edge of an annular lip or rim 17 formed by portions 18 and 19 at the inner ends of the plates 14 and 15 which project into the chambers 12 and 13. The lip or rim is parallel sided being of the same width as the plates 14 and 15. The width of the lip or rim 17 is equal to that of the axial length of an annular groove or recess 20 to be moulded into the piston or plunger 21 at an intermediate point in its axial length, and the radial depth of the lip or rim 17 is equal to the radial depth of the annular groove or recess 20.

With the die parts 10 and 11 and the die plates 14 and 15 in the position shown in the drawings, synthetic resinous material is injected in to the cavity formed by the co-operating chambers 12 and 13 in the die parts 10 and 11 through an outwardly tapered axial passage 22 in the die part 10. The plastics material fills the cavity and surrounds the lip or rim 17. At the termination of the moulding injection, and before releasing the moulding pressure and allowing the material to cool substantially, the plates 14 and 15 are rotated together in the same direction relative to the die parts 10 and 11 about the central axis of the piston or plunger through an angular distance of substantially 10°. This angular movement ensures that any flash of resinous material on the base or sides of the groove or recess 18 at the mould line between the abutment surface of the portions 18 and 19 where they abut, such as indicated at 23 in FIG. 3 of the drawings is removed by a rubbing action. Thus the surfaces of the piston or plunger 21 defining the groove or recess 20 in the finished condition are smooth and do not require any further machining or flash-removal operation.

To facilitate flash removal, it is preferable that the degree of flash occurring is maintained at a minimum value, for example between 0.0002 inches and 0.0003 inches. This is achieved by ensuring that the die plates 14 and 15 are an accurate fit at their abutting surfaces.

After the die plates 14 and 15 have been rotated, and after sufficient cooling has taken plate, the finished piston or plunger is removed from the die by moving the die parts 10 and 11 axially away from each other to withdraw them from the piston or plunger. Thereafter the die plates 14 and 15 are moved away from each other in a radial direction to effect removal of the portions 18 and 19 from the groove or recess 20.

In a modification the moulding process can be carried out by compressing an initial volume of resinous material in the die cavity. This is achieved by opening the die parts inserting the resinous material into the cavity, and thereafter moving the die parts towards each other. In the apparatus used in the modified process there is no passage 22.

The use to which the article in accordance with our invention is to be put dictates the particular synthetic resinous material which is used in the moulding process. For example, when the article is a piston or plunger adapted to work in a cylinder bore of a master cylinder or slave cylinder of an hydraulic braking system, the material chosen must be capable of exhibiting sufficient strength to withstand the hydraulic pressures to which it is subjected, and at the same time be sufficiently hard and wear resistant to withstand the reciprocable movements within the cylinder bore. Furthermore the material must be resistant to decomposition or other detrimental effects by the hydraulic fluid with which it is in contact. We have found that glass and graphite filled polyesters comprise suitable materials for constructing the pistons or plungers.

It is usual to manufacture pistons or plungers for use in master cylinders or slave cylinders of vehicle braking systems from metal. Despite high quality surface finishes on metal pistons or plungers, scoring of the metal bores in which they work can still occur. Such scoring may lead eventually to failure of the seals carried by the pistons or plungers with consequent failure of the braking or other hydraulic system in which the master cylinders or slave cylinders are incorporated. It is thus advantageous to construct the pistons or plungers from synthetic resinous materials which minimize the risk of scoring of the bores since these materials are softer than the metal bores. More particularly, it is advantageous to construct pistons or plungers by the method described above since pistons or plungers constructed thereby are free from flash which would otherwise have to be removed by an additional machining or finishing operation.

What is claimed is:

1. A method of manufacturing from a synthetic resinous material an article having in its outer surface a continuous recess comprising the steps of:

taking a first die part having a first open-ended chamber terminating in a first end face;

taking a second die part having a second open-ended chamber terminating in a second end face;

taking at least two die plates each having a pair of parallel, opposed side faces;

relatively moving said die plates into a position in which said die plates are inter-engaging edge-to-edge relationship and there is defined between said die plates an opening of constant depth and diameter, said opening being smaller than said first and second chambers at said first and second end faces;

relatively moving said first and second die parts into a position in which said first and second end faces abut respective opposed side faces of said die plates and said first and second open-ended chambers and said opening define a die cavity including an intermediate cylindrical portion of reduced diameter defined by said opening;

moulding in said die cavity resinous material to form an article having in the outer surface thereof a continuous recess corresponding to the dimensions of said intermediate cylindrical portion of said die cavity;

rotating relatively to each other said die plates and said article about the axis of said intermediate cylindrical portion of said die cavity whereby any flash occurring at the interface between said die plates and the surface of said recess in said article at points where said die plates meet each other is removed; and separating said die parts and said die plates and removing said article therefrom.

2. A method as claimed in claim 1, wherein said die plates and said article are rotated relatively to each other at the termination of the moulding process before releasing moulding pressure and allowing said article to cool.

3. A method as claimed in claim 1, wherein said die plates and said article are rotated relatively to each other through an angular distance of substantially 10°.

4. A method as claimed in claim 1, wherein separation of said first and second die parts takes place in an axial direction and separation of said die plates takes place in a radial direction.

5. A method as claimed in claim 1, wherein said moulding step is carried out by injecting resinous material into said die cavity under pressure.

6. A method as claimed in claim 1, wherein said moulding step is carried out by compressing an initial volume of resinous material in said die cavity.

* * * * *